United States Patent [19]
Ohlsson

[11] Patent Number: 5,852,776
[45] Date of Patent: Dec. 22, 1998

[54] TELECOMMUNICATIONS SYSTEM WITH PERSON/SUBSCRIBER-ASSOCIATED IDENTIFICATION

[75] Inventor: Bo Ohlsson, Haninge, Sweden

[73] Assignee: Telia AB, Farsta, Sweden

[21] Appl. No.: 622,286

[22] Filed: Mar. 25, 1996

[30] Foreign Application Priority Data

Mar. 23, 1995 [SE] Sweden .................................. 9501051

[51] Int. Cl.⁶ ...................................................... H04Q 7/00
[52] U.S. Cl. ........................ 455/406; 455/552; 455/74.1; 455/435
[58] Field of Search .......................... 455/407, 552–554, 455/406, 408, 422, 555, 74.1, 435

[56] References Cited

U.S. PATENT DOCUMENTS

| | | | |
|---|---|---|---|
| 4,640,986 | 2/1987 | Yotsutani et al. | 455/407 |
| 4,776,000 | 10/1988 | Parienti | 455/407 |
| 4,989,230 | 1/1991 | Gillig et al. | 455/552 |
| 5,463,674 | 10/1995 | Gillig et al. | 455/552 |
| 5,526,402 | 6/1996 | Dent et al. | 455/74.1 |
| 5,526,403 | 6/1996 | Tam | 455/426 |
| 5,577,101 | 11/1996 | Bohm | 455/406 |

*Primary Examiner*—Dwayne D. Bost
*Assistant Examiner*—Tracy M. Legree
*Attorney, Agent, or Firm*—Oblon, Spivak, McClelland, Maier & Neustadt, P.C.

[57] ABSTRACT

Telecommunications system including a fixed tele- and datacommunications system, hereinafter called a fixed system, and a radio communications system, for instance a GSM-system, hereinafter called a mobile system, the mobile system including mobile units. A respective mobile unit of a number of mobile units is arranged for connection to an optional subscriber line or extension line in the fixed system via a connection device (for instance a jack), and the fixed and/or the mobile system is/are arranged with identification devices which identify via said connection device, to the fixed system, a connected mobile unit for enabling billing for the use of the mobile unit in the fixed system.

19 Claims, 1 Drawing Sheet

TELECOMMUNICATIONS SYSTEM WITH PERSON/SUBSCRIBER-ASSOCIATED IDENTIFICATION

TECHNICAL FIELD

The invention relates to a telecommunications system with subscriber-related information.

PRIOR ART

There have previously been suggested different ways and devices to forward telephone calls. European document EP.A2. 484067 describes automatic forwarding of calls. Calls are automatically forwarded to a subscriber who is on the move by collecting position information when the subscriber performs certain actions, such as making his/her purchases by means of a credit card or making a call by means of a credit card.

U.S. Pat. No. 5,315,636 shows a "personal telecommunications system" where a subscriber only needs a personal telephone number and where a call to this number is automatically connected to the telephone terminal which is nearest the subscriber. The subscriber carries a personal communication unit which by means of radio communication allows his/her position to be determined. The position is registered in a database and when a call is coming in to the subscriber, the call is connected to the terminal which corresponds to the subscriber's present or latest known position.

SUMMARY OF THE INVENTION

An object of the invention is to achieve an improved and simplified telecommunications system in relation to the prior art.

In the future the public land-based telecommunications network will allow personal mobility, i.e. that the subscriber can register himself/herself at an optional telecommunication terminal at the location where the subscriber is at present, or to/from where he/she wants his/her incoming/ outgoing calls connected. When debiting takes place, it shall be possible to debit only the subscriber who is the owner of that terminal. Today, work is performed to make it possible to combine this personal mobility (UPT) with the terminal mobility which is offered by the mobile systems. A disadvantage with the UPT-service is that the subscriber has to make a call to register himself/herself at just that telephone. This function is similar to the roaming function which is used in the mobile systems, but with the difference that the function there is automated. The technical problem the invention relates to is therefore to produce a device and a method which allows automatic registration in the fixed public telecommunications network for the service personal number through the use of a portable telecommunications terminal telecommunications network.

The main characteristics of the invention are briefly, that one or more mobile units are arranged for connection to an optional subscriber line or an extension line in the fixed telecommunications network via a connection device, for instance a jack. In the arranged fixed and/or mobile systems, identification devices identify the mobile unit connected via the connection devices to the fixed network. This arrangement makes possible debiting based on the use of the mobile unit in the fixed network. Further, the system can be entered by connection to the connection device of the subscriber line or extension line by means of mobile units of the type which exist in cellular radio communications systems, such as GSM, NMT, etc., and that the telecommunications system is arranged to operate with mobility functions which correspond to the mobility functions of the cellular system.

The telecommunications system also shows a construction which when compared with the cellular system replaces the BSC- and BTS-functions with a connection to fixed subscriber lines, and that existing mobility functions are implemented in a UPT-system and where connections have been established for the connectivity to said UPT-system of the mobile units.

The invention offers a number of advantages, among other things a better and more flexible communications system is obtained. Further the handling of the mobile telephones or the mobile stations is made easier. The probability that one will reach a person one is in search of is increased. The use of one telephone number for a subscriber during his/her different situations in the course of a day also results in increased accessibility and availability.

DESCRIPTION OF FIGURES

The invention will now be described by means of an embodiment, and not restricting the invention to the embodiment, and with references to the drawings in which.

DETAILED DESCRIPTION

Figure 1:
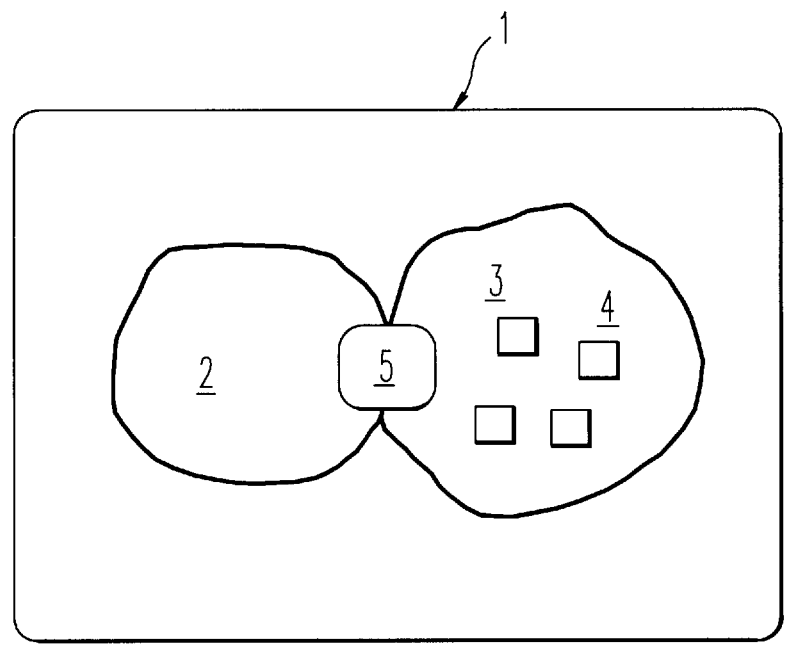
FIG. 1 shows a telecommunications network according to the invention.

FIG. 1 shows an embodiment of the inventive telecommunications system 1 including a fixed tele- and data communications system 2, hereinafter called a fixed system, and a radio communications system 3, for instance of the GSM-system variety, hereinafter called a mobile system, in which the mobile system includes mobile units 4. In the mobile system, respective mobile units of a number of mobile units, for instance all mobile units 4, are arranged for connection to an optional subscriber line or an extension line in the fixed system via a connection device (for instance a jack). In the fixed and/or the mobile system arranged identification devices 5 identify the mobile unit connected via said connection device to the fixed system, thereby making possible the debiting of the use of the mobile unit in the fixed system.

The total coverage of the mobile telephone network is divided into switch areas, MSC-areas, which in turn can consist of one or more traffic areas, "Location areas". A characteristic of a location area is that a mobile user can move within the area without the need to update a traffic area register, "location register". Within each location area there are a number of base stations connected and each having coverage over local areas called cells. The location areas consist of a number of "Base Station Systems" (BSS). A base station system covers a base station area consisting of one or more cells. The Base Station System consist of Base Station Controller (BSC), and a number of stations including both transmitters and receivers, so called Base Transceiver Stations (BTS).

BSC is a network component which controls one or more BTS's, and has the main tasks of managing traffic channels by channel allocation, control and disconnection of links, power control as well as managing measurements at handover.

A BTS is a network component which serves a cell. BTS contains one or more combined transmitters/receivers, Transceivers (TRX).

A PLMN is divided accordingly into one or more mobile telephone switches depending on the size of the system (capacity and coverage) the operator provides in his/her system.

The mobile telephone switch is called a "Mobile Service Switching Center" (MSC). The MSC operates as an interface between the fixed telephone network and the mobile telephone network (Gateway MSC) and between a number of MSCs which serve different geographical parts of the network.

The mobile station is the subscriber's equipment which can be mounted in a car or be handportable. In GSM there is an obvious difference between the physical device and the subscription. All information which is bound to the subscriber is stored on a "smart card" which can be used in just any mobile station.

The visitor register (location area register) "Visited Location Register" (VLR) holds subscriber information for those who are in the location areas belonging to this VLR. When a subscriber "mobile" is searched for, a "roaming number" is fetched by the "Home Location Register" (HLR) which has a reference to the Visited Location Register (VLR) in question. In this way the network rapidly and efficiently can find the mobile at calls from the telecommunications network. Each mobile belongs to a home register (HLR). This register holds all necessary subscriber and mobile information, among other things it contains information about in which VLR and location area the mobile is located.

HLR is the register from which Gateway MSC or a telephone station (in the fixed network) asks for information in order to get the wanted mobile "roaming number." If a mobile moves from one location area to another, all relevant register parameters of the mobile are transferred from HLR to the VLR of the new location area. In HLR, a reference is made to the new VLR.

The GSM-system has by the invention been further developed to comprise traffic also in the fixed network, resulting in that a combined terminal mobility and personal mobility can be offered to the customers who want it, and in the future perhaps the majority of all subscribers. The result is a GSM-variant where the mobility functions (for the SIM-card and by that the subscriber) still exist, but BSC and BTS are replaced by connections to fixed subscriber lines.

The invention results in at least two new components, one of which is the network:—One "GSM local switch"—One "fixed GSM-telephone", respective one "dual mode telephone" (dealt with in a separate patent application).

A "GSM local switch" does not have any real switch function except at the subscriber stage, irrespective of whether these subscribers are remote or not. This "local switch" connects the subscribers via the A-interfaces with MSC, which is a proper switch. Because handover is not needed in wirebased telephony, the BSC-function consequently can be replaced by this simple "local switch" which can manage all signalling from the MSC. The subscribers are divided into "Local Areas" in a way that a registering subscriber (e.g., a telephone with SIM-card) can authenticate itself and update the localization registers (HLR/VLR). The signalling to/from the fixed telephone is made with DTMF, which in the "local switch" is converted to signalling for the A-interface.

It must be emphasized that this UPT-functionality only can be offered to the subscriber lines which are connected to a "GSM local switch" ("an access point for a fixed GSM-telephone").

Figure 2:
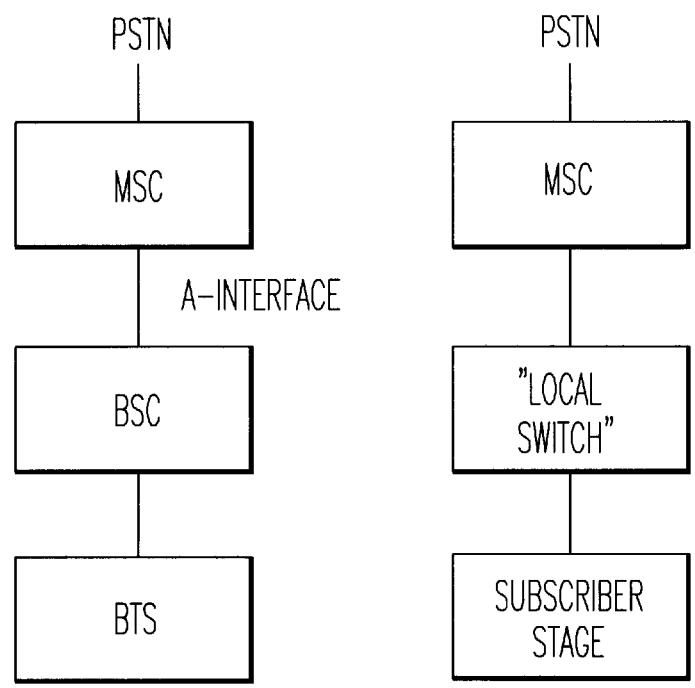
FIG. 2 shows the change from mobile GSM to "fixed GSM".

In FIG. 2 is shown how the mobile GSM-network in principle is changed in such a way that it can offer fixed telephony in the form of a UPT-service. It must be noticed that the two MSCs might be replaced by one which handles both "fixed" and mobile subscribers. It is further assumed that all MSCs in a network are connected.

The telecommunications system according to the invention consists of a fixed tele- and data communications system (also called a general public fixed system) and a radio communications system for instance of a variant of the GSM-system described as a mobile communications system with a number of portable mobile telephones. These mobile telephones can be connected to optional subscriber lines and extension lines. This can be done in many different ways, for instance by different types of jacks and connection devices.

When the mobile unit is connected to the fixed network the identification device identifies that it is a mobile telephone which is connected. The identification device consists, to certain parts, of known functionality from corresponding devices from the conventional mobile telephony system, as well as other functions which are indicative of signals emanating from the conventional fixed system. These signals which are forwarded in the network are sensed by the network and make it possible to bill a subscriber who is connected to the mobile telephone for a call which emanates from the fixed network.

The idea of the invention also can be described as a universal personal telecommunications system (UPT) device where subscribers in the system have the possibility to enter or get access to the system via optional subscriber or extension connections. The system identifies the entered subscriber thereby making it possible to debit the subscriber for the subscriber's use of the system. Further, the system can be entered by connection to a connection device (subscriber- or extension jack) of the subscriber- or extension line by means of a mobile unit of the type which exists in cellular radio communications systems. Such a unit is usually a variant of the GSM-system of which the telecommunications system is arranged to operate with mobility functions corresponding to the mobility functions of the cellular radio communications system.

The telecommunications system further shows a construction which in comparison with the cellular radio based system has the BSC- and BTS-functions replaced for connection of fixed subscriber lines.

A use of the concept according to the invention is that mobility functions in cellular radio communication systems, preferably of the GSM type, where the positions for the mobile units of the system can be traced by means of identification devices, make it possible to debit subscribers for their use of the system when used in a universal personal telecommunications system (UPT) where connections/jacks to fixed subscriber and extension lines have been arranged for the connectivity of respective mobile unit to the UPT.

Another concept for employing the invention is as a mobile unit using the mobility functions which exist in a cellular radio communications system, preferably of the GSM-system type. The mobile unit is used as a mobile device in a fixed telecommunications system which executes universal personal telephony by means of mobility functions which correspond to the mobility functions in the cellular radio communications system, in which fixed system connections are made via connection devices/connection jacks to subscriber or extension lines.

Another embodiment of the invention also can be described as a universal personal telecommunications system (UPT) device where a subscriber in the system may enter the system via an optional subscriber or extension connection and the system identifies the entering subscriber in order to debit the subscriber. The system operates with the mobility functions which correspond to the mobility functions in a cellular radio communications system, preferably the GSM-system, such that instead of using the BSC and BTS stages in the cellular radio communications system connections to fixed subscriber lines are arranged instead.

One unit is arranged to connect the subscribers transparently via a fixed connection with a BSC (compare the function for the cellular radio communications system) which operates with a switching function. The one unit is for the connection of the subscribers, and in principle replaces the BSC-function, and has a concentrator function.

As with a cellular communications system, the subscribers are divided into location areas thereby making it possible for a registering or entering subscriber (e.g., telephone/mobile unit with SIM-card) to update the localization registers (comparable to HLR/VLR).

The invention is not restricted to the shown examples or embodiment, but can be varied in just any way within the frame of the idea of the invention, such as it is defined in the following patent claims.

I claim:

1. A telecommunications system comprising:
   a fixed communications system, including at least one of a subscriber line and an extension line;
   a mobile unit including a connection device for connecting to the at least one of a subscriber line and an extension line of the fixed communications system;
   a mobile radio communications system for communication with the mobile unit; and
   an identification device for identifying to the fixed communications system via said connection device that said mobile unit is connected to the fixed communications system to enable debiting based on the mobile unit's use of the fixed system.

2. A system according to claim 1, comprising:
   each subscriber having corresponding subscriber information including at least one of a number, a subscriber's personal profile, and a value added service, wherein each subscriber can be reached independent of where the subscriber is registered.

3. A universal personal telecommunications system comprising:
   a fixed communications system including at least one of a subscriber line and an extension line;
   a connection device;
   means for identifying a subscriber entering the telecommunications system;
   a mobile unit, said connecting device for connecting said mobile unit to said at least one of the subscriber line and the extension line of the fixed communication system; and
   means for operating in said telecommunications system with mobility functions that correspond with a set of mobility functions of a radio communications system, whereby a subscriber may enter the telecommunications system via the at least one of the subscriber line and the extension line, and for the telecommunications system to identify for debit purposes the subscriber who entered the system.

4. The telecommunications system according to claim 3, wherein the telecommunications system replaces a BSC function and a BTS function associated with mobility functions of the radio communications system with a connection to a fixed subscriber line.

5. A system of claim 3, wherein said set of mobility functions are cellular radio communications systems mobility functions.

6. The system of claim 3, further comprising:
   a plurality of localization registers; and
   each subscriber having subscriber information including at least one of a personal number, a subscriber's personal profile, and a value added service, said subscriber being registered in one of the localization registers;
   wherein the subscriber can be reached independent of which one of the localization registers the subscriber is registered.

7. A universal personal telecommunications system comprising:
   a fixed system having at least one of a fixed subscriber line and a fixed extension line;
   a mobile unit having subscriber information including at least one of a personal number, a subscriber's personal profile, and a value added service;
   a connection device for connecting said mobile unit to at least one of said fixed subscriber line and said fixed extension line;
   means for performing a mobility function; and
   an identification device for identifying a use of the system by said mobile unit, said mobile unit connecting to said fixed system via said connection device and by said means for performing said mobility function of said telecommunication system; and
   a plurality of localization registers,
   wherein the mobile unit is registered in one of the plurality of localization registers and can be reached independent of in which one of the plurality of localization registers the mobile unit is registered.

8. The device of claim 7, wherein the mobility function is a cellular radio communications systems mobility function.

9. A universal personal telecommunications system comprising:
   at least one of an optional subscriber connection and an optional extension connection;
   means for performing a set of system mobility functions that correspond with a set of radio communications system mobility functions that include a BSC mobility function and a BTS mobility function;
   means for identifying a subscriber entering the telecommunications system; and
   means for connecting the subscriber to said at least one of said subscriber connection and said extension connection such that said means for connecting is used instead of said BSC mobility function and said BTS mobility function, whereby said system allows the subscriber to enter the telecommunications system via the at least one of the optional subscriber connection and the optional extension connection, and for the telecommunications system to identify for debit purposes the subscriber's use of the telecommunications system.

10. The telecommunications system according to claim 9, further comprising a unit for connecting the subscriber transparently via a fixed connection to the telecommunications system through a BSC which operates with a switching function.

11. A telecommunications system according to claim 10, wherein said unit performs a concentrator function.

12. The system of claim 11, wherein the telecommunications system includes at least one location area, and a respective localization register for holding subscriber information, such that the respective localization register is updated when the subscriber enters one of said at least one location area.

13. The system according to claim 10, further comprising at least one location area, and a respective localization register for holding subscriber information, such that the respective localization register is updated when the subscriber enters said at least one location area.

14. The telecommunications system according to claim 9 further comprising at least one location area, and a respective localization register for holding subscriber information, such that the respective localization register is updated when the subscriber enters a one of said at least one location area.

15. The system of claim 6, further comprising:
   a plurality of localization registers; and
   each subscriber having subscriber information including at least one of a personal number, a subscriber's personal profile, and a value added service, said subscriber being registered in one of the localization registers;
   wherein the subscriber can be reached independent of which one of the localization registers the subscriber is registered.

16. The device of claim 9, wherein the set of system mobility functions is a set of cellular radio communications systems mobility functions.

17. A telecommunications system comprising:
   a mobile unit having subscriber information including at least one of a personal number, a subscriber's personal profile, and a value added service;
   a set of mobility functions used in a cellular radio communications system;
   a fixed telecommunications system having a corresponding set of mobility functions that correspond with the set of mobility functions in the cellular radio communications system and at least one of a subscriber line and an extension line; and
   a fixed telecommunications system connection device for connecting said mobile unit to the at least one of the subscriber line and the extension line; and a plurality of localization registers;
   wherein the mobile unit is registered in one of the plurality of localization registers and can be reached independent of in which one of the plurality of localization registers the mobile unit is registered.

18. A system according to claim 17, wherein the mobile unit is used in the telecommunications system and in a radio communications system.

19. The device of claim 17, wherein said corresponding set of mobility functions is the set of mobility functions used in the cellular radio communications system.

* * * * *